(12) United States Patent
Patel (10) Patent No.: US 11,434,037 B2
(45) Date of Patent: Sep. 6, 2022

(54) FURAN CAN

(71) Applicant: Amisha Patel, Carlsbad, CA (US)

(72) Inventor: Amisha Patel, Carlsbad, CA (US)

( * ) Notice: Subject to any disclaimer, the term of this patent is extended or adjusted under 35 U.S.C. 154(b) by 246 days.

(21) Appl. No.: 16/101,505

(22) Filed: Aug. 12, 2018

(65) Prior Publication Data

US 2020/0047939 A1 Feb. 13, 2020

(51) Int. Cl.
| | |
|---|---|
| *B65D 41/10* | (2006.01) |
| *B65D 17/00* | (2006.01) |
| *B65D 51/22* | (2006.01) |
| *B65D 85/72* | (2006.01) |
| *C08L 67/02* | (2006.01) |
| *C08G 63/16* | (2006.01) |
| *B65D 1/16* | (2006.01) |
| *B29K 67/00* | (2006.01) |

(52) U.S. Cl.
CPC ............ *B65D 1/165* (2013.01); *B65D 17/02* (2013.01); *B65D 85/72* (2013.01); *B29K 2067/00* (2013.01); *B65D 2517/0014* (2013.01); *B65D 2565/386* (2013.01)

(58) Field of Classification Search
CPC ...... B29K 2067/00; B65D 1/165; B65D 1/16; B65D 17/02; B65D 2517/0014; B65D 2565/386; B65D 85/72; B65D 51/222; B65D 2517/008; B65D 17/4012; B65D 2543/00296; B65B 7/2842; B65B 7/2871; B65B 7/2878; B65B 7/28; B29C 66/71; B29C 66/542
USPC ........ 220/634, 605, 630, 906, 613, 269, 271
See application file for complete search history.

(56) References Cited

U.S. PATENT DOCUMENTS

| | | | | |
|---|---|---|---|---|
| 1,326,885 A | * | 12/1919 | Wales | .................... B65D 25/54 |
| | | | | 220/281 |
| 3,108,710 A | * | 10/1963 | Lange | ................ B65D 81/2015 |
| | | | | 220/613 |
| 3,204,805 A | * | 9/1965 | May | ....................... B65D 17/28 |
| | | | | 220/257.2 |

(Continued)

OTHER PUBLICATIONS

Stokes, Vijay K, Joining Methods for Plastics and Plastic Composites: An Overview, 1989, Polymer Engineering and Science vol. 29, No. 19 pp. 1310-1324 (Year: 1989).*

(Continued)

*Primary Examiner* — Gideon R Weinerth
(74) *Attorney, Agent, or Firm* — Eversheds Sutherland (US) LLP; Christopher C. Bolten; Robert D. Ward (57) ABSTRACT

A furan can for containing a product includes a sealed container that contains the product and includes a furan resin selected from the group consisting of: poly (ethylene 2,5-furan dicarboxylate) (PEF), poly (butylene 2,5-furan dicarboxylate) (PBF), poly (trim ethylene furan dicarboxylate) (PTF), poly (propylene 2,5-furandicarboxylate) (PPF), and poly (neopentyl 2,5-furandicarboxylate) (PNF); and a release mechanism to open the container and access the product. The can may further include a generally cylindrical shell molded to have a sealed bottom and a straight wall that includes the furan resin; and a cap to seal the shell, the cap having the release mechanism and a rim that includes the furan resin; wherein the rim of the cap is bonded to the wall of the shell to releasably seal the product inside the can.

19 Claims, 6 Drawing Sheets

(56) References Cited

U.S. PATENT DOCUMENTS

| | | | | |
|---|---|---|---|---|
| 3,342,365 | A * | 9/1967 | Johnh | B29C 66/1122 220/4.21 |
| 3,356,263 | A * | 12/1967 | Monroe | B65D 35/12 222/107 |
| 3,424,343 | A * | 1/1969 | Hoffelman | B65D 11/00 220/613 |
| 3,685,685 | A * | 8/1972 | Phillips | B65D 15/18 220/611 |
| 3,787,547 | A * | 1/1974 | Leslie | B29C 49/0073 264/249 |
| 4,011,968 | A * | 3/1977 | McGhie | B65D 35/12 222/107 |
| 4,044,917 | A * | 8/1977 | Vella | B65D 41/086 220/288 |
| 4,501,375 | A * | 2/1985 | Katsura | B65D 17/4012 220/270 |
| 4,591,066 | A * | 5/1986 | Moen | B65D 17/02 215/376 |
| 4,711,362 | A * | 12/1987 | Korcz | B65D 15/18 220/613 |
| 4,840,289 | A * | 6/1989 | Fait | B29C 65/0672 220/270 |
| 4,883,192 | A * | 11/1989 | Krugman | B65D 25/48 220/711 |
| 4,886,181 | A * | 12/1989 | Haines | B29C 65/58 220/617 |
| 4,890,759 | A * | 1/1990 | Scanga | B65D 17/4011 220/273 |
| 4,948,006 | A * | 8/1990 | Okabe | B29C 45/14 156/228 |
| 5,713,484 | A * | 2/1998 | Setty | B65D 43/0206 220/612 |
| 5,785,198 | A * | 7/1998 | Credle, Jr. | B65D 45/305 220/254.8 |
| 6,105,807 | A * | 8/2000 | McCrossen | B65D 79/005 220/288 |
| 6,358,343 | B1 * | 3/2002 | Scott | B29C 66/545 156/292 |
| 6,712,232 | B2 * | 3/2004 | Tanaka | B29C 45/14598 215/379 |
| 7,137,524 | B2 * | 11/2006 | Nomula | B65D 17/4012 220/269 |
| 7,951,417 | B1 * | 5/2011 | Wen | C04B 26/003 427/188 |
| 10,604,296 | B2 * | 3/2020 | Kick | B65D 1/165 |
| 10,737,426 | B2 * | 8/2020 | Poulat | B65D 1/0223 |
| 10,738,149 | B2 * | 8/2020 | Bastioli | C08J 5/045 |
| 10,799,424 | B2 * | 10/2020 | Knobel | B65D 21/0233 |
| 2003/0038103 | A1 * | 2/2003 | Sirotkin | B29C 49/00 215/43 |
| 2005/0017005 | A1 * | 1/2005 | Nomula | B65D 17/4012 220/254.1 |
| 2005/0061706 | A1 * | 3/2005 | Reynolds | B65D 25/54 206/540 |
| 2011/0017753 | A1 * | 1/2011 | Lewis | B65D 1/165 220/669 |
| 2011/0120902 | A1 * | 5/2011 | Boswell | B65D 65/38 206/524.6 |
| 2011/0282020 | A1 * | 11/2011 | Sipos | C08K 5/52 526/270 |
| 2012/0258299 | A1 * | 10/2012 | Matsuda | C08L 67/02 428/220 |
| 2012/0283452 | A1 * | 11/2012 | Munoz De Diego | C07D 307/40 549/485 |
| 2013/0171397 | A1 * | 7/2013 | Ghosh | B32B 1/02 528/302 |
| 2013/0270212 | A1 * | 10/2013 | Collias | B65D 41/02 215/316 |
| 2015/0110983 | A1 * | 4/2015 | Kriegel | B65D 1/0207 428/36.6 |
| 2015/0337080 | A1 * | 11/2015 | Bhattacharjee | C08G 63/672 528/298 |
| 2016/0009015 | A1 * | 1/2016 | Bouffand | B29C 49/0005 53/453 |
| 2016/0167279 | A1 * | 6/2016 | Besson | B29C 49/12 426/590 |
| 2017/0197930 | A1 * | 7/2017 | Sokolovskii | B01J 8/02 |
| 2018/0244834 | A1 * | 8/2018 | Webster | C08G 59/3236 |
| 2019/0366616 | A1 * | 12/2019 | Berny | B29C 51/002 |
| 2020/0047939 | A1 * | 2/2020 | Patel | C08L 67/00 |
| 2022/0089861 | A1 * | 3/2022 | Durie | C08K 5/0083 |

OTHER PUBLICATIONS

Troughton, Michael J. Handbook of Plastics Joining (Second Edition), Chapter 4—Spin Welding, 2009, William Andrew Publishing, pp. 49-55 (Year: 2009).*

* cited by examiner

FURAN CAN

BACKGROUND OF THE INVENTION

The present invention generally relates to beverage container and specifically to an environmentally friendly can from furan-based polyesters.

There is a desire to make products that are environmentally friendly, from plant materials that are compostable, which thus can lead to zero waste, thereby reducing waste. Traditionally, many drinks and beverages such as soft drinks, water, juices, wine, beer, and milk have been supplied in glass, plastic or aluminum bottles or aluminum cans. However, these glass, plastic and aluminum can materials require much more energy than bioplastic materials to be made into bottles or cans. In the last decade, there has been an increased interest from the food packaging industry toward the development and application of bioplastics, to contribute to the sustainable economy and to reduce the huge environmental problem afflicting the planet.

In embodiments of the present work, we focus on a new furan-based polyester, namely, poly (ethylene 2,5-furan dicarboxylate) (PEF), poly (butylene 2,5-furan dicarboxylate) (PBF), poly (trim ethylene furan dicarboxylate) (PTF), poly (propylene 2,5-furandicarboxylate) (PPF), and poly (neopentyl 2,5-furandicarboxylate) (PNF), to be used for sustainable food packaging applications Furan moieties may have thermal stability characterized by a higher Tg and Tm. Furan moieties may include PNF, which has a low RAF fraction compared to poly (propylene 2,5-furandicarboxylate) [also called-furanoate] (PPF), ascribable to the two methyl side groups present in PNF glycol-sub-unit. PNF's mechanical characteristics, i.e., very high elastic modulus and brittle fracture, low resistance to environmental stress cracking, drop impact performance were found to be superior to those of PPF and PEF. Barrier properties to different gases, temperatures and relative humidity were evaluated. From the results obtained, PNF was showed to be a material with superior barrier performances, significantly superior with respect to PEF's ones. PNF's permeability behavior did not appreciably change after contact with food simulants. The furan moieties are not necessarily biodegradable, but may be recyclable. Because of these properties, furan resins may be superior to aluminum for making cans.

A user may derive the furan based resins from plants. Aluminum may be melted at 2000 degrees F. to recycle. Furan requires 300 degrees to return back to resin. A product made with a combination of furan-based resin and Aluminum could be recycled as is currently done with Aluminum cans.

It would be desirable to have a can that includes furan-based resin and that that can be recycled.

SUMMARY OF THE INVENTION

In one aspect of the present invention, a can for containing a product includes a sealed container that contains the product and includes a furan resin selected from the group consisting of: poly (ethylene 2,5-furan dicarboxylate) (PEF), poly (butylene 2,5-furan dicarboxylate) (PBF), poly (trim ethylene furan dicarboxylate) (PTF), poly (propylene 2,5-furandicarboxylate) (PPF), and poly (neopentyl 2,5-furandicarboxylate) (PNF); and a release mechanism to open the container and access the product.

In another aspect of the present invention, the can further includes a generally cylindrical shell molded to have a sealed bottom and a straight wall that includes the furan resin; and a cap to seal the shell, the cap having the release mechanism and a rim that includes the furan resin; wherein the rim of the cap is bonded to the wall of the shell to releasably seal the product inside the can.

In yet another aspect of the present invention, a method for providing a can with a product includes providing a furan resin selected from the group consisting of PEF, PBF, PTF, PPF and PNF; injection molding a generally cylindrical shell having a sealed bottom and a straight wall that includes the furan resin; forming a cap having a release mechanism and a rim that includes the furan resin; placing the product in the shell; and bonding the cap to the shell, thereby releasably sealing the product in the can.

DETAILED DESCRIPTION

The preferred embodiment and other embodiments, which can be used in industry and include the best mode now known of carrying out the invention, are hereby described in detail with reference to the drawings. Further embodiments, features and advantages will become apparent from the ensuing description, or may be learned without undue experimentation. The figures are not necessarily drawn to scale, except where otherwise indicated. The following description of embodiments, even if phrased in terms of "the invention" or what the embodiment "is," is not to be taken in a limiting sense, but describes the manner and process of making and using the invention. The coverage of this patent will be described in the claims. The order in which steps are listed in the claims does not necessarily indicate that the steps must be performed in that order.

The preferred embodiment and other embodiments, which can be used in industry and include the best mode now known of carrying out the invention, are hereby described in detail with reference to the drawings. Further embodiments, features and advantages will become apparent from the ensuing description, or may be learned without undue experimentation. The figures are not necessarily drawn to scale, except where otherwise indicated. The following description of embodiments, even if phrased in terms of "the invention" or what the embodiment "is," is not to be taken in a limiting sense, but describes the manner and process of making and using the invention. The coverage of this patent will be described in the claims. The order in which steps are listed in the claims does not necessarily indicate that the steps must be performed in that order.

The present invention relates to a furan resin based beverage container made into a can. Embodiments may include a package and a method of forming a package. The invention may relate to a package that is easily disposable, and is recyclable.

Embodiments of the present invention may include furan-based polyester, namely, poly (ethylene 2,5-furan dicarboxylate) (PEF), poly (butylene 2,5-furan dicarboxylate) (PBF) and poly (trim ethylene furan dicarboxylate) (PTF), and poly (propylene 2,5-furandicarboxylate) (PPF), poly (neopentyl 2,5-furandicarboxylate) (PNF), to be used for sustainable food packaging applications. These aromatic polyesters may be successfully synthesized with high molecular weight, through a solvent-free process, starting directly from 2,5-furandicarboxylic acid.

Embodiments of a furan can and cap may be blow molded, injection molded or extruded into any desired shaped can and cap.

Embodiments may include an ultra-thin lining or pouch from a renewable resource, to help reduce the carbon footprint of non biodegradable material.

In accordance with a general aspect of the present invention, there is provided a can comprising a hollow shell defining the can body and including an opening, and a bottom. The can is secured by a cap on the outside of the shell. The cap may be made from a same furan resin. The wall thickness of the hollow shell can vary from 0.4 to 2 mm and the cap thickness can vary from 0.8 to 2.5 mm.

Embodiments of a cap may be made from a furan resin. Embodiments of a cap may be injection blow molded in the shape required and in a design with an outlet opening which can be a standard stay-on tab end release mechanism. Embodiments of an outlet opening may have a larger design, for easier drinking and pouring. A cap assembly may be bonded and permanently secured to an open end of the hollow shell ridge after the shell has product placed in it. A circular spin welding machine achieves bonding or bio based glue can be used to achieve an air tight joint. The top open ridge of a hollow shell ridge and the lower ridge of the cap may be heat seamed by the circular spin welding machine or can be glued using a bio based glue. The cap may be designed to have an air tight seal.

Embodiments of a container may have a wall and a cap that meet moisture resistant or waterproof or gas permeation requirements or both. The container may hold liquids or solids that are sensitive to moisture and water vapor permeation, or gas permeation for gasses such as oxygen and carbon dioxide.

Embodiments of a cap opening may be of different styles including standard stay on tab, ring pull tab or peal tub allowing for easy and comfortable pouring, dispensing or drinking.

In one embodiment, a can may be manufactured by blow molding a shell or "preform," then cutting off the top. A release mechanism could then be attached to the fully pre-formed shell. A slug or preform made from furan-based resin may be heated to just below the melting point. The form may be stretched and blow molded in a case, so that the form takes the shape of the case. The top part of the formed slug may be cut off, leaving only the shell with a curved open end. Because of the built-in rim, the shell will curve in toward the shell's center, near the top of the shell. The can may be filled with product, and a lid with a release mechanism may be added to the shell and sealed to the top.

In a second embodiment of a can, a shell may be injection molded and a cap having a release mechanism for opening the cap may be made separately, and the cap may be attached to the shell by a circular welding machine for plastic. Such a process may require more steps than the first embodiment, but may be more cost effective.

A furan-based resin may be used in an injection mold machine to prepare a shell. The resin may be melted and injected under pressure into an injection mold, to produce a generally cylindrical shell with a sealed bottom. The shell may be a cylinder with a hollow body that is be open at one end, and have straight sides or a circular wall with no shoulder, to facilitate ejection of the shell from the mold.

An embodiment of a cap having a top and bottom may also be injection molded from a furan-based resin. A first side of the cap may include a rim having a shape that corresponds to the upper opening of the shell, and a second side of the cap may include a release mechanism. The rim may include a shoulder that flares or curves from the attachment point on the bottom for the shell to the release mechanism on the top. The release mechanism may also be made of furan-based resin, or may include other materials such as Aluminum, or both. The shell may be filled with product, and the cap may be welded to the open end of the shell with a circular welding machine for plastic.

Embodiments of a cap may be made of the same material as the shell, or a different material such as aluminum can be utilized. Aluminum can be recycled. Aluminum may be melted at 2000 degrees F. to recycle. Furan requires 300 degrees to return back to resin. A user may derive the furan based resin from plants, and then recycle the entire item as is currently done with Aluminum cans.

Figure 1:
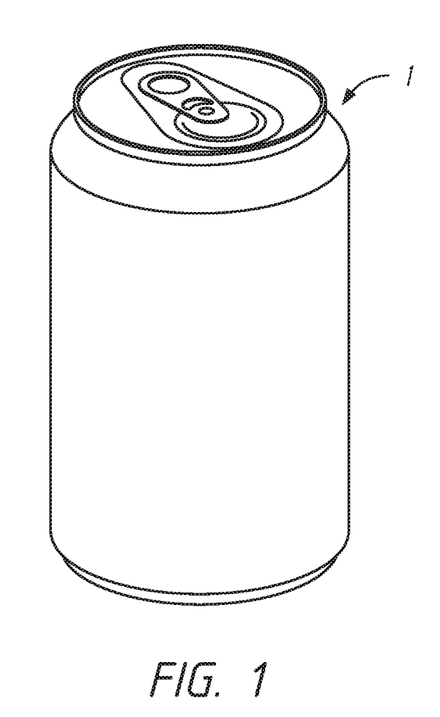
FIG. 1 depicts an embodiment of a can according to the present invention.

FIG. 1 depicts an embodiment of a can 1 with a generally cylindrical main body. The can may partially or entirely consist of furan resin.

Figure 2:
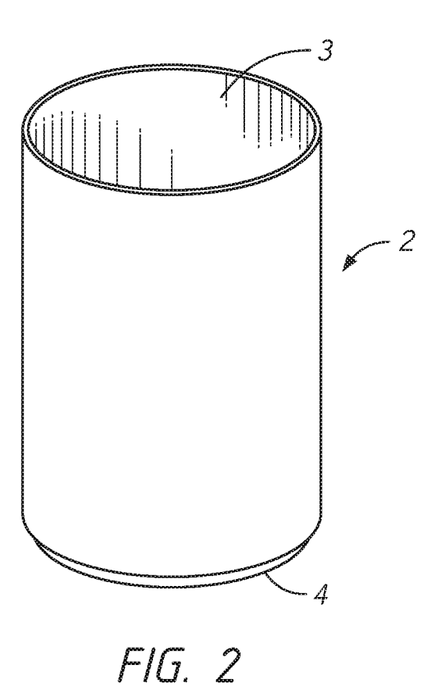
FIG. 2 depicts an embodiment of a hollow shell with closed and open end according to the present invention.

FIG. 2 depicts an embodiment of a hollow shell 2 with an upper opening 3 and lower closed bottom 4. This hollow shell 2 may be stretch blow molded from a preform (a small plastic tube or hollow shell) and the top of the preform removed to achieve the hollow cylindrical shell with an open and closed end. Embodiments may be injection molded or extruded. Embodiments of the closed bottom 4 may have a flat bottom of a concave shape to allow for expansion of contents.

Figure 3:
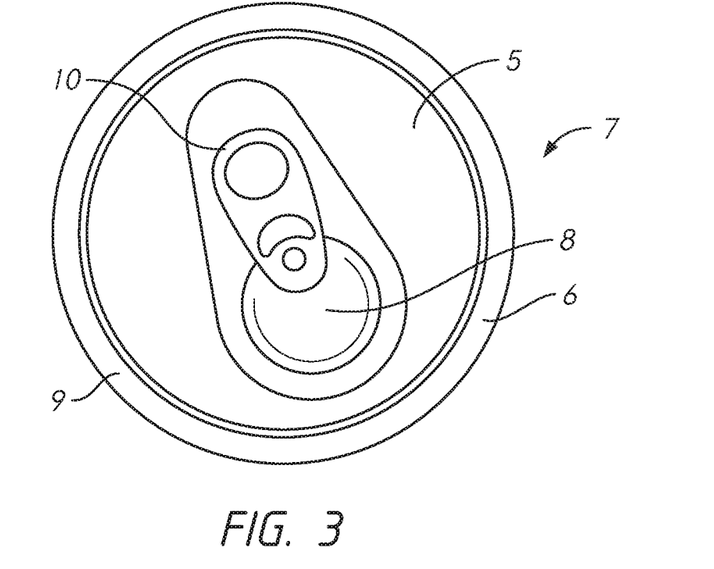
FIG. 3 depicts a top view of an embodiment of cap according to the present invention.
Figure 4:
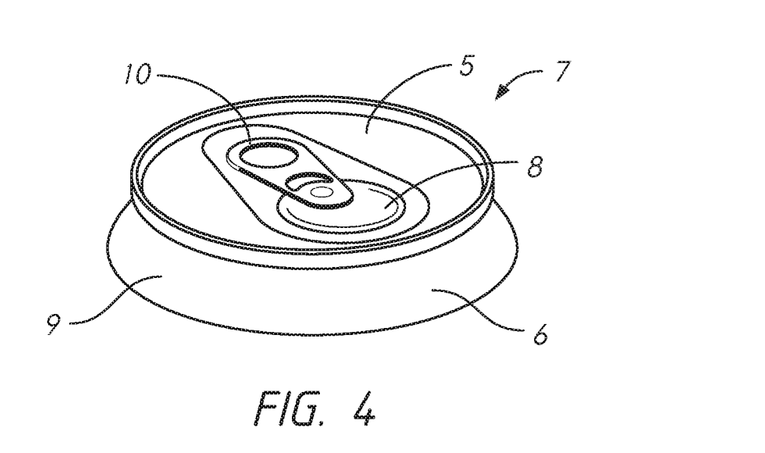
FIG. 4 depicts a perspective view the cap of FIG. 3.

FIGS. 3 and 4 depict an embodiment of a cap 7 having a rim 6 and a release mechanism 5. Rim 6 may have a shoulder 9 that flares in from the bottom of the rim to the release mechanism 5. Release mechanism 5 may include an outlet opening 8 and a lever 10. Release mechanism 5 may be injection molded or extruded, and may include furan-based resin or aluminum or both.

Figure 5:
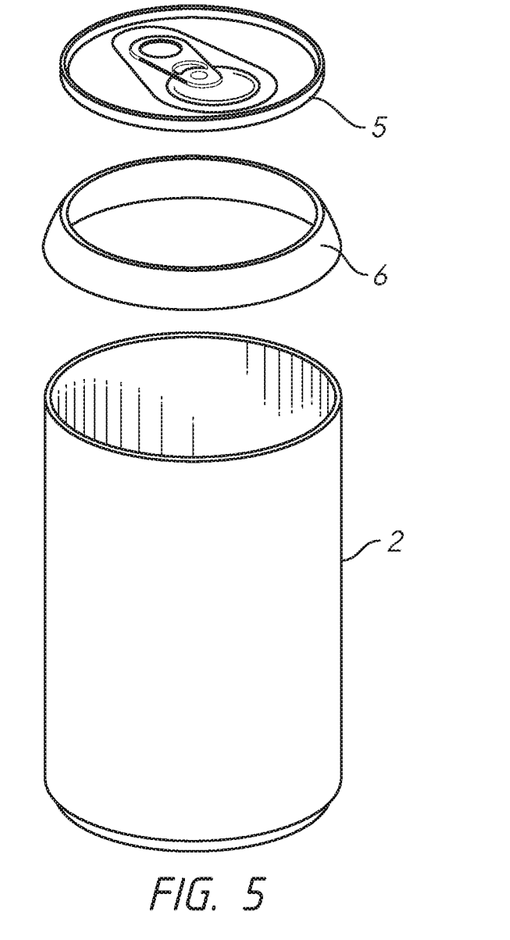
FIG. 5 depicts an exploded view of the can of FIG. 1.

FIG. 5 depicts an embodiment of a hollow shell 2, rim 6 and release mechanism 5. The rim 6 and the release mechanism 5 may be attached together to assemble a cap, the shell 2 can be filled with content, and then the cap can be welded onto the shell 2.

Figure 6:
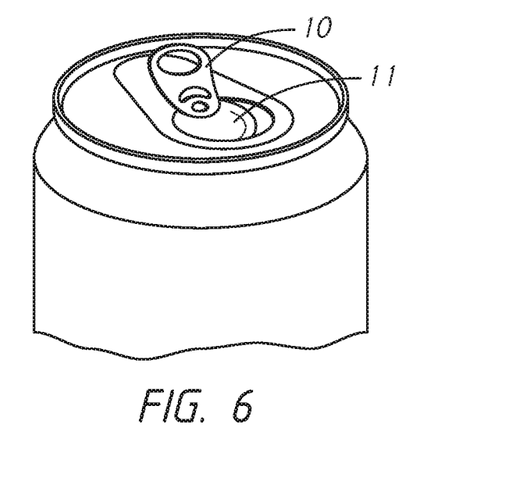
FIG. 6 depicts an upper portion of the can of FIG. 1 in the open position.

FIG. 6 depicts an embodiment of a can that has been opened. The outlet opening 11 may be opened by upward movement of the lever 10.

Figure 7:
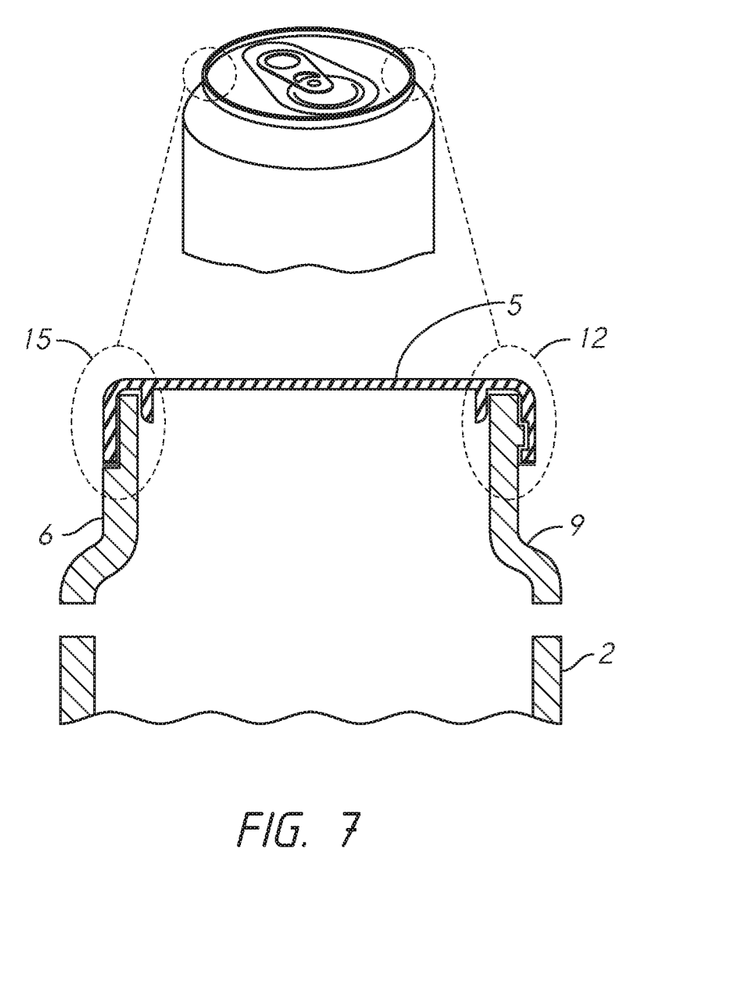
FIG. 7 depicts an embodiment of a cap and hollow shell engagement according to the present invention.

FIG. 7 depicts a cap and hollow shell engagement having a rim 6 with an air tight lip. Embodiments of a rim 6 may provide a shoulder 9 between release mechanism 5 and hollow shell 2. Embodiments of rim 6 may include air tight mechanisms 12 and 15 between the flat part of release mechanism 5 and the top part of rim 6. The adhesion may be achieved by a bio based glue or by circular or spin welding machine.

Figure 8:
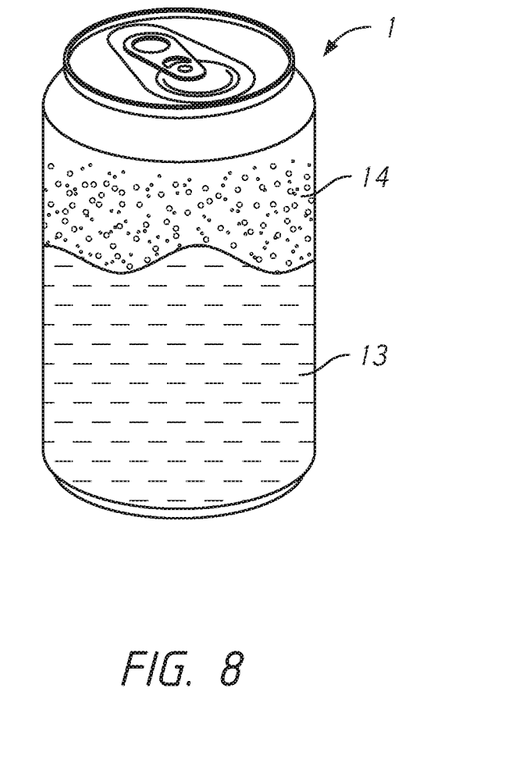
FIG. 8 depicts a can containing product according to the present invention.

As depicted in FIG. 8, can 1 may have a releasably sealed interior cavity that holds fluids 13 and air or gas 14. To provide a product, a furan resin is stretch blow molded from a preform, injection molded or by an extrusion process.

An environmentally friendly can from furan polyesters that are recyclable may include a shell defining a hollow body of the can and a wall of the shell that includes a furan resin; and a furan based cap. When the hollow shell and cap are assembled and attached and air tight can is formed.

I claim:

1. A container for containing a product, the container comprising:
   a shell comprising a first end defining an opening and a second end that is sealed, the shell configured to contain the product and comprising a furan resin selected from the group consisting of:
   poly (ethylene 2,5-furan dicarboxylate) (PEP),
   poly (butylene 2,5-furan dicarboxylate) (PBF),
   poly (trimethylene furan dicarboxylate) (PTF),
   poly (propylene 2,5-furandicarboxylate) (PPF), and
   poly (neopentyl 2,5-furandicarboxylate) (PNF);
   a cap coupled to the first end of the shell, said cap comprising:
      a rim comprising (i) a first air tight mechanism and (ii) a second air tight mechanism, the first air tight mechanism being different than the second air tight mechanism; and
      a release mechanism coupled to the rim and attached via bio based glue at the first air tight mechanism and the second air tight mechanism; and
      a release lever configured to open the container; wherein
   the cap is coupled to the shell using one or more of spin welding or a bio based glue.

2. The container of claim 1, wherein the shell is a cylindrical shell comprising a sealed bottom and a wall.

3. The container of claim 2, wherein the rim of the cap narrows near the top portion of the cap and the rim is coupled to the wall of the shell.

4. The container of claim 1, wherein the release lever is configured to lift to puncture the cap thereby opening the container.

5. The container of claim 1, wherein the furan resin is PEF.

6. The container of claim 1, wherein the furan resin is PBF.

7. The container of claim 1, wherein the furan resin is PTF.

8. The container of claim 1, wherein the furan resin is PPF.

9. The container of claim 1, wherein the furan resin is PNF.

10. The container of claim 1, wherein the cap comprises a furan resin selected from the group consisting of:
    poly (ethylene 2,5-furan dicarboxylate) (PEF),
    poly (butylene 2,5-furan dicarboxylate) (PBF),
    poly (trimethylene furan dicarboxylate) (PTF),
    poly (propylene 2,5-furandicarboxylate) (PPF); and
    poly (neopentyl 2,5-furandicarboxylate) (PNF).

11. The container of claim 1, wherein the cap comprises a furan resin selected from the group consisting of:
    poly (butylene 2,5-furan dicarboxylate) (PBF),
    poly (trimethylene furan dicarboxylate) (PTF),
    poly (propylene 2,5-furandicarboxylate) (PPF); and
    poly (neopentyl 2,5-furandicarboxylate) (PNF).

12. A method for providing a container for containing a product, comprising:
    selecting a shell comprising a first end defining an opening and a second end that is sealed, the shell comprising a furan resin selected from the group consisting of:
    poly (ethylene 2,5-furan dicarboxylate) (PEP),
    poly (butylene 2,5-furan dicarboxylate) (PBF),
    poly (trimethylene furan dicarboxylate) (PTF),
    poly (propylene 2,5-furandicarboxylate) (PPF), and
    poly (neopentyl 2,5-furandicarboxylate) (PNF);
    selecting a cap comprising a rim comprising a first air tight mechanism and a second air tight mechanism, the first air tight mechanism being different than the second air tight mechanism, a release mechanism including a release lever coupled to the rim, wherein said release mechanism is adapted to conform to the first air tight mechanism and the second air tight mechanism;
    coupling the release mechanism to the rim using bio based glue at the first and second air tight mechanisms; and
    coupling the cap to the shell using one or more of bio based glue or spin welding.

13. The method of claim 12, wherein the shell is formed by injection molding.

14. The method of claim 12, wherein the shell is formed by blow molding.

15. The method of claim 12, wherein the shell is formed by extrusion.

16. The method of claim 12, wherein the shell is a cylindrical shell comprising a sealed bottom and a wall.

17. The method of claim 12, wherein the furan resin is selected from the group consisting of:
    poly (butylene 2,5-furan dicarboxylate) (PBF),
    poly (trimethylene furan dicarboxylate) (PTF),
    poly (propylene 2,5-furandicarboxylate) (PPF); and
    poly (neopentyl 2,5-furandicarboxylate) (PNF).

18. The method of claim 12, wherein the cap comprises a furan resin.

19. The method of claim 18, wherein the furan resin is selected from the group consisting of:
    poly (butylene 2,5-furan dicarboxylate) (PBF),
    poly (trimethylene furan dicarboxylate) (PTF),
    poly (propylene 2,5-furandicarboxylate) (PPF); and
    poly (neopentyl 2,5-furandicarboxylate) (PNF).

* * * * *